United States Patent
Wu et al.

(10) Patent No.: US 8,711,914 B2
(45) Date of Patent: Apr. 29, 2014

(54) CHANNEL ESTIMATING METHOD AND DEVICE

(75) Inventors: Gengshi Wu, Shanghai (CN); Meng Hua, Shanghai (CN); Chunling Zhang, Shanghai (CN); Shurong Jiao, Shanghai (CN); Xiuqin Peng, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 99 days.

(21) Appl. No.: 13/463,452

(22) Filed: May 3, 2012

(65) Prior Publication Data

US 2012/0213264 A1    Aug. 23, 2012

Related U.S. Application Data

(63) Continuation of application No. PCT/CN2010/076102, filed on Aug. 18, 2010.

(30) Foreign Application Priority Data

Nov. 3, 2009  (CN) .......................... 2009 1 0221113

(51) Int. Cl.
*H04B 3/46*    (2006.01)
(52) U.S. Cl.
USPC ........... 375/224; 375/295; 375/316; 375/227; 375/285; 370/206; 370/491; 370/500
(58) Field of Classification Search
USPC .......... 375/224, 295, 316, 227, 285; 370/206, 370/491, 500
See application file for complete search history.

(56) References Cited

U.S. PATENT DOCUMENTS

2003/0235237 A1* 12/2003 Smolyar ..................... 375/148
2007/0230601 A1* 10/2007 Yim et al. ................... 375/260

FOREIGN PATENT DOCUMENTS

| CN | 1819570 A | 8/2006 |
|---|---|---|
| CN | 101277127 A | 10/2008 |
| CN | 101359926 A | 2/2009 |
| CN | 101364831 A | 2/2009 |
| CN | 101494470 A | 7/2009 |
| CN | 101753489 A | 6/2010 |
| WO | WO 2008/118514 A2 | 10/2008 |
| WO | WO 2011/054233 A1 | 5/2011 |

OTHER PUBLICATIONS

International Search Report and Written Opinion of the International Searching Authority issued in corresponding PCT Patent Application No. PCT/CN2010/076102, mailed Nov. 18, 2010.
Wenjuan et al., "Application of the Interpolation Filter in Symbols Synchronization" Electronic Science and Technology, Jul. 21, 2008.
Chinese Patent No. 101753489, issued on Oct. 3, 2012, granted in corresponding Chinese Patent Application No. 200910221113.3.

* cited by examiner

*Primary Examiner* — Zewdu Kassa
(74) *Attorney, Agent, or Firm* — Brinks Gilson & Lione (57) ABSTRACT

A channel estimating method and device are provided. The method includes: performing multi-path searching on a pilot channel, and performing interpolation on a channel estimation value at a radial position of the multi-path searching (101); performing raised cosine de-convolution on the channel estimation value that undergoes the interpolation (102); acquiring the channel estimation value at each radial position in the pilot channel according to the channel estimation value that undergoes the raised cosine de-convolution and a sample deviation acquired by performing the multi-path searching (103). The channel estimating method and device eliminate the sample deviation of the channel estimation value, improve the demodulation performance, and evidently reduce the operation workload.

10 Claims, 4 Drawing Sheets

CHANNEL ESTIMATING METHOD AND DEVICE

CROSS-REFERENCE TO RELATED APPLICATIONS

This application is a continuation of International Application No. PCT/CN2010/076102, filed on Aug. 18, 2010, which claims priority to Chinese Patent Application No. 200910221113.3, filed on Nov. 3, 2009, both of which are hereby incorporated by reference in their entireties.

BACKGROUND OF THE FIELD

The present invention relates to the field of communications technologies, and more particularly to a channel estimating method and device.

Background of the Field

In many cases, a receiver cannot acquire optimal sampling of a received signal through direct sampling, i.e., a deviation smaller than a sampling interval exists between a sampled signal and a transmitting chip. When an equalization coefficient is calculated directly based on sampling data with sample deviation, the demodulation performance may be affected greatly, especially in a high-order modulation mode, such as 64 Quadrature Amplitude Modulation (Quadrature Amplitude Modulation; hereinafter referred to as: 64QAM). A Wideband Code Division Multiple Access (Wideband Code Division Multiple Access; hereinafter referred to as: WCDMA) system is taken as an example to describe the processing on the sample deviation.

A wireless transmission channel environment of the WCDMA system is a frequency selective multi-path channel, and a multi-channel with different delays leads to interference. A WCDMA receiver is often a multipoint (Rake) receiver or an equalizer. High Speed Downlink Packet Access (High Speed Downlink Packet Access; hereinafter referred to as: HSDPA), as an enhanced evolution technology of WCDMA, provides a high-speed data rate which is needed for implementing multimedia services in the 3rd Generation Mobile Communication System, and greatly improves the utilization of spectrum and code resources of the system and effectively improves performance and capacity of the wireless network. The HSDPA signal is usually received by the equalizer, and when the equalization coefficient is calculated, channel estimation must be performed on all the sampling points within a period.

A WCDMA downlink receiver first samples the received signal periodically, and the sampling frequency is an integral multiple of the chip transmitting frequency (usually double or quadruple). Because the transmission delay of the receiver to the signal is usually unknown, to synchronously sample an output signal of the receiver, symbol timing must be acquired from the received signal. In the prior art, the WCDMA system performs multi-path searching to perform timing estimation on different multi-path components so as to realize phase alignment of a local chip and a chip of the received signal, and then the channel estimation is performed through a Common Pilot Channel (Common Pilot Channel; CPICH).

During the process of implementing the present invention, the inventor finds at least the following problems in the prior art: when the channel estimation is performed, in the prior art, the interpolation filter is controlled by using the timing error estimation value to perform an interpolation operation on the signal acquired from independent sampling, so that an approximation when the signal is at the optimal decision sample time is acquired. Because the interpolating processing must be performed at each sampling point, and the sampling rate is usually the double or quadruple of the chip rate, the operation workload is rather large.

SUMMARY OF THE INVENTION

Embodiments of the present invention provide a channel estimating method and device, which eliminate a sample deviation of a channel estimation value, and reduce the operation workload.

An embodiment of the present invention provides a channel estimating method, including:
performing multi-path searching on a pilot channel, and performing interpolation on a channel estimation value at a radial position of the multi-path searching;
performing raised cosine de-convolution on the channel estimation value that undergoes the interpolation; and
acquiring the channel estimation value at each radial position in the pilot channel according to the channel estimation value that undergoes the raised cosine de-convolution and a sample deviation acquired by performing the multi-path searching.

An embodiment of the present invention also provides a channel estimating device, including:
a search module, configured to perform multi-path searching on a pilot channel;
an interpolation module, configured to perform interpolation on a channel estimation value at a radial position of the multi-path searching;
a raised cosine de-convolution module, configured to perform raised cosine de-convolution on the channel estimation value that undergoes the interpolation performed by the interpolation module; and
a channel estimation value acquiring module, configured to acquire the channel estimation value at each radial position in the pilot channel according to the channel estimation value that undergoes the raised cosine de-convolution and a sample deviation acquired by performing the multi-path searching.

The embodiments of the present invention perform interpolation on the channel estimation value at the radial position of the multi-path searching, and perform raised cosine de-convolution on the channel estimation value that undergoes the interpolation; and then acquire the channel estimation value at each radial position in the pilot channel according to the channel estimation value that undergoes the raised cosine de-convolution and a sample deviation acquired by performing the multi-path searching. The channel estimating method and device provided in the embodiments of the present invention eliminate the sample deviation of the channel estimation value, improve the demodulation performance, and evidently reduce the operation workload.

DETAILED DESCRIPTION OF THE INVENTION

Figure 1:
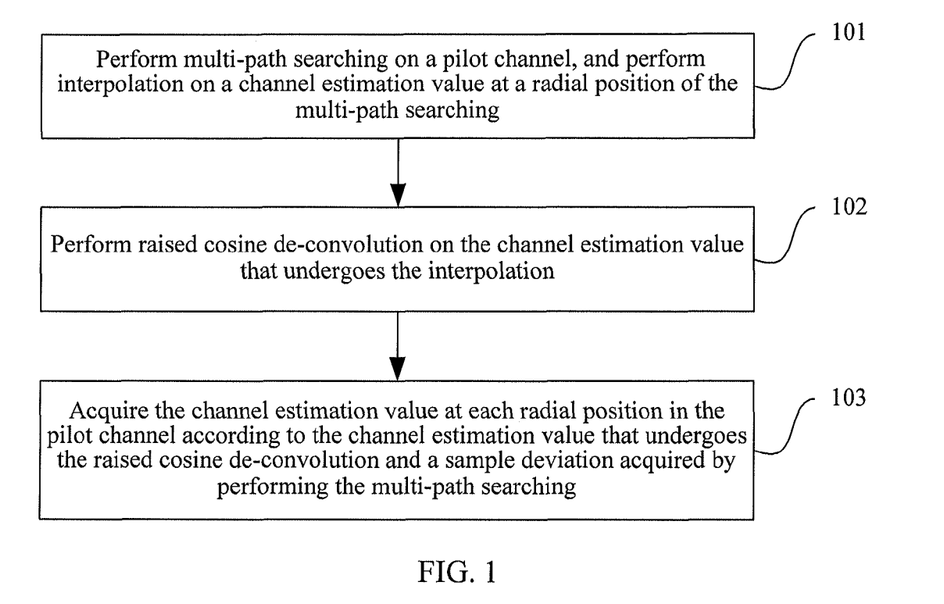
FIG. 1 is a flow chart of a channel estimating method according to an embodiment of the present invention.

FIG. 1 is a flow chart of a channel estimating method according to an embodiment of the present invention. As shown in FIG. 1, the embodiment includes the following steps:

Step 101: Perform multi-path searching on a pilot channel, and perform interpolation on a channel estimation value at a radial position of the multi-path searching.

In this embodiment, the performing interpolation on the channel estimation value at the radial position of the multi-path searching may be any interpolating method, for example, Quadratic interpolation or Sinc interpolation. In the embodiments of the present invention, performing the Sinc interpolation of truncating a limited length on the channel estimation value at the radial position of the multi-path searching is taken as an example.

Step 102: Perform raised cosine de-convolution on the channel estimation value that undergoes the interpolation.

In this embodiment, after interpolation on the channel estimation value at the radial position of the multi-path searching is performed, in order to eliminate interference of an adjacent path to the current path in the channel estimation value that undergoes the interpolation, a raised cosine de-convolution operation needs to be performed on the channel estimation value that undergoes the interpolation.

Step 103: Acquire the channel estimation value at each radial position in the pilot channel according to the channel estimation value that undergoes the raised cosine de-convolution and a sample deviation acquired by performing the multi-path searching.

In the above embodiment, interpolation is performed on the channel estimation value at the radial position of the multi-path searching, and raised cosine de-convolution is performed on the channel estimation value that undergoes the interpolation; and then the channel estimation value at each radial position in the pilot channel is acquired according to the channel estimation value that undergoes the raised cosine de-convolution and a sample deviation acquired by performing the multi-path searching. By using the channel estimating method provided in this embodiment, the sample deviation of the channel estimation value is eliminated, the demodulation performance is improved, and the operation workload is reduced evidently.

Figure 2:
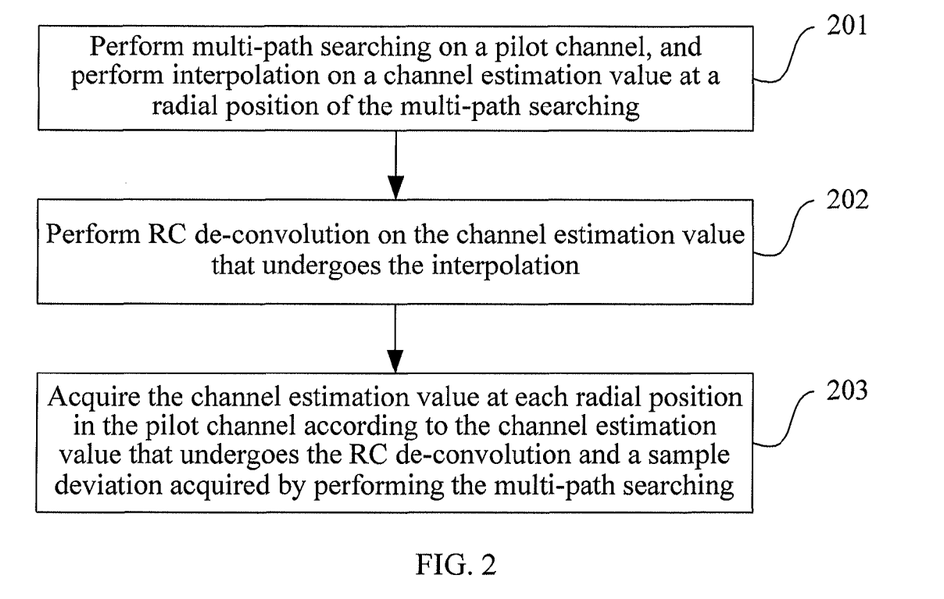
FIG. 2 is a flow chart of a channel estimating method according to another embodiment of the present invention.

FIG. 2 is a flow chart of a channel estimating method according to another embodiment of the present invention. As shown in FIG. 2, the embodiment includes the following steps:

Step 201: Perform multi-path searching on a pilot channel, and perform interpolation on a channel estimation value at a radial position of the multi-path searching.

In this embodiment, windows are configured on left and right sides of the radial position of the multi-path searching, and the length of the windows is a multi-path delay spread L, and channel estimation is performed on the sampling points in the windows. Assume that a sampling rate is P, and then LxP channel estimation values are acquired, which have interference of the sample deviation acquired by performing the multi-path searching. And then, interpolation is performed on the channel estimation value at the radial position of the multi-path searching among the LxP channel estimation values. When the interpolation is performed, any interpolating method can be used, for example, Quadratic interpolation or Sinc interpolation. In this embodiment, performing the Sinc interpolation of truncating a limited length on the channel estimation value at the radial position of the multi-path searching is taken as an example.

Interpolation is performed on the channel estimation value in the time domain. According to the Nyquist law, as long as the sampling frequency is higher than twice of the signal frequency, an ideal Sinc interpolation can recover an original signal without distortion. Because the ideal Sinc interpolation is impossible, in specific implementation, the Sinc interpolation of truncating a limited length can be used to eliminate the sample deviation of the channel estimation value.

Specifically, the Sinc interpolation of truncating a limited length on the channel estimation value at the radial position of the multi-path searching may be: performing convolution on the total LxP channel estimation values at the radial position of the multi-path searching and the adjacent paths of the radial position with a Sinc coefficient that undergoes windowing and truncation.

The Sinc coefficient that undergoes windowing and truncation can be acquired by multiplying a Sinc function and a window function. For example, an ideal Sinc coefficient may be:

$$SincTaps[u(k)] = \begin{cases} 1, & u(k) = 0 \\ \frac{\sin(\pi \times u(k))}{\pi \times u(k)}, & u(k) \neq 0 \end{cases} \quad (1)$$

In equation (1), u(k) is a sampling point position, and SincTaps[u(k)] is the ideal Sinc coefficient of the sampling point.

This embodiment uses a Kaiser window function to implement a low-pass filter to truncate a limited length of the ideal Sinc coefficient. Assume that the Kaiser window is an X−1 order, a tap coefficient is WinKaiser[i], 1=0, 1, ..., X, then the Sinc coefficient that undergoes windowing and truncation may be:

$$\text{Tap }[i]=SincTaps[i]\times WinKaiser[i] \quad (2)$$

In equation (2), Tap [i] is the Sinc coefficient that undergoes windowing and truncation.

Step 202: Perform raised cosine (Raised Cosine; hereinafter referred to as: RC) de-convolution on the channel estimation value that undergoes the interpolation.

In this embodiment, after Sinc interpolation of truncating a limited length is performed on the channel estimation value at the radial position of the multi-path searching, in order to eliminate the interference of the adjacent paths to the current path in the channel estimation value that undergoes the interpolation, an RC de-convolution operation needs to be performed on the channel estimation value that undergoes the interpolation. The interference of the adjacent paths to the current path in the channel estimation value that undergoes the interpolation is mainly caused by the impact response of the RC.

Specifically, assume that 6 valid paths are acquired by performing the multi-path searching, and their radial positions are P1, P2, P3, P4, P5, and P6. Assume that the channel estimation values acquired after the Sinc interpolation of truncating a limited length is performed on the channel estimation values at the radial positions of the multi-path searching are respectively: $h_1'$, $h_2'$, $h_3'$, $h_4'$, $h_5'$ and $h_6'$ Assume that the channel estimation values acquired after RC de-convolution on $h_1'$, $h_2'$, $h_3'$, $h_4'$, $h_5'$ and $h_6'$ is performed are $h_1$, $h_2$, $h_3$, $h_4$, $h_5$ and $h_6$; RC is an impact response of a filter transmitting Root Raised Cosine (Root Raised Cosine; hereinafter referred to as: RRC) convolution and receiving RRC. When the interference of noise is ignored, $h_1$, $h_2$, $h_3$, $h_4$, $h_5$ and $h_6$ can be calculated through the equation (3).

$$\begin{bmatrix} h_1' \\ h_2' \\ h_3' \\ h_4' \\ h_5' \\ h_6' \end{bmatrix} = \begin{bmatrix} 1 & RC(\tau_{1,2}) & RC(\tau_{1,3}) & RC(\tau_{1,4}) & RC(\tau_{1,5}) & RC(\tau_{1,6}) \\ RC(\tau_{2,1}) & 1 & RC(\tau_{2,3}) & RC(\tau_{2,4}) & RC(\tau_{2,5}) & RC(\tau_{2,6}) \\ RC(\tau_{3,1}) & RC(\tau_{3,2}) & 1 & RC(\tau_{3,4}) & RC(\tau_{3,5}) & RC(\tau_{3,6}) \\ RC(\tau_{4,1}) & RC(\tau_{4,2}) & RC(\tau_{4,3}) & 1 & RC(\tau_{4,5}) & RC(\tau_{4,6}) \\ RC(\tau_{5,1}) & RC(\tau_{5,2}) & RC(\tau_{5,3}) & RC(\tau_{5,4}) & 1 & RC(\tau_{5,6}) \\ RC(\tau_{6,1}) & RC(\tau_{6,2}) & RC(\tau_{6,3}) & RC(\tau_{6,4}) & RC(\tau_{6,5}) & 1 \end{bmatrix} \times \begin{bmatrix} h_1 \\ h_2 \\ h_3 \\ h_4 \\ h_5 \\ h_6 \end{bmatrix} \quad (3)$$

In equation (3), $\tau_{i,j}$ is a radial interval, $\tau_{i,j}=P_i-P_j$. In this embodiment, I, j $\in \{1, 2, 3, 4, 5, 6\}$, and i≠j; RC $(\tau_{i,j})$ may be acquired through equation (4):

$$RC(t) = \frac{\sin\left(\frac{\pi t}{T}\right)}{\frac{\pi t}{T}} \times \frac{\cos\left(\frac{\pi \alpha t}{T}\right)}{1 - \frac{4\alpha^2 t^2}{T^2}} \quad (4)$$

In equation (4), it is assumed $\alpha=0.22$, $T=0.26042$ μs.

Step 203: Acquire the channel estimation value at each radial position in the pilot channel according to the channel estimation value that undergoes the RC de-convolution and a sample deviation acquired by performing the multi-path searching.

Figure 3:
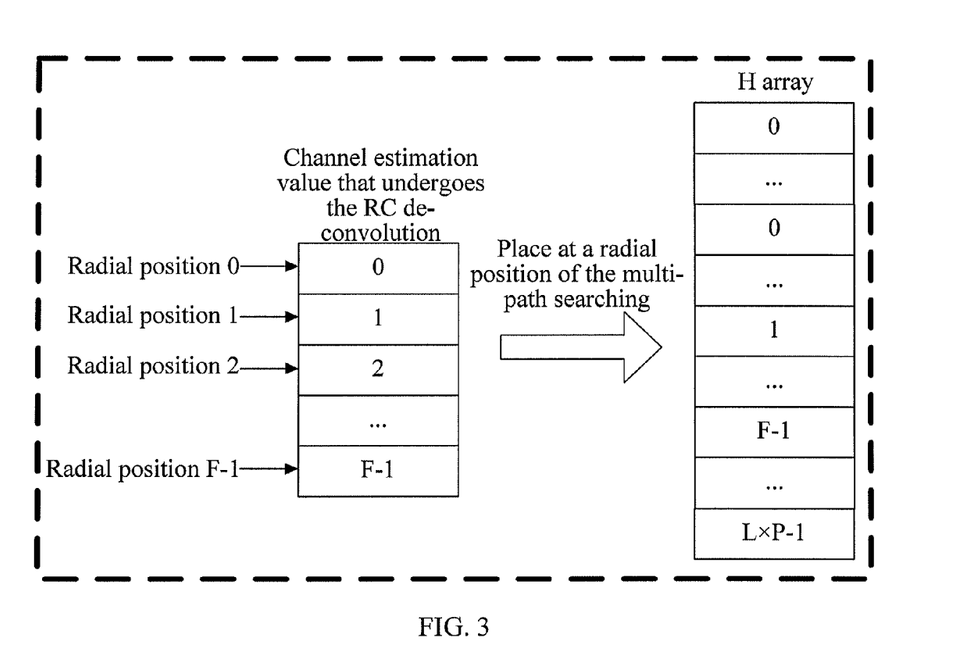
FIG. 3 is a schematic diagram of generating an H array according to an embodiment of the present invention.

In an implementation of this embodiment, RC convolution may be first performed on a channel estimation value that undergoes the RC de-convolution, the sampling rate of the RC convolution is the same as the sampling rate of the RC de-convolution; and then the convolution is performed on the channel estimation value that undergoes the RC convolution and the Sinc coefficient that undergoes windowing and truncation to acquire the channel estimation value at each radial position in the pilot channel. Specifically, the channel estimation value that undergoes the RC de-convolution can be placed at the radial position of the multi-path searching, and the rest positions are set to 0 to generate an H array with the length of LxP, which is recorded as H(t). FIG. 3 is a schematic diagram of generating an H array according to an embodiment of the present invention.

Then, the RC convolution is performed on the H array, and the specific convolution equation is shown in equation (5):

$$Hout(i) = \sum_{t=0}^{i} H(t)RC(i-t), \quad (5)$$

$$i = 0, 1, \ldots , L \times P + N - 2$$

In equation (5), the length of Hout(i) is LxP+N−1, where N is the length of the coefficient of the RC filter; RC(i−t) is the coefficient of the RC filter which can be acquired through the equation (4).

After Hout(i) is acquired, convolution is performed on Hout(i) and the Sinc coefficient that undergoes windowing and truncation to acquire the channel estimation value at each radial position in the pilot channel. The objective of performing convolution on Hout(i) and the Sinc coefficient that undergoes windowing and truncation is to add the sample deviation acquired by performing the multi-path searching to improve the accuracy of the channel estimation value at each radial position in the pilot channel.

In another implementation of this embodiment, RC convolution with a higher sampling rate is performed on the channel estimation value that undergoes the RC de-convolution, i.e., the sampling rate of the RC convolution is higher than the sampling rate of the RC de-convolution; and then the channel estimation value at each radial position of the pilot channel is selected according to the sample deviation of the multi-path searching among the channel estimation values that undergo the RC convolution.

In the above embodiment, Sinc interpolation is performed on the channel estimation value at the radial position of the multi-path searching, and the RC de-convolution is performed on the channel estimation value that undergoes the Sinc interpolation; and then the channel estimation value at each radial position in the pilot channel is acquired according to the channel estimation value that undergoes the Sinc interpolation and a sample deviation acquired by performing the multi-path searching. By using the channel estimating method provided in this embodiment, the sample deviation of the channel estimation value is eliminated, the demodulation performance is improved, and the operation workload is reduced evidently.

Persons skilled in the art can understand that: all or part of the steps of the above embodiment can be implemented through a program instructing relevant hardware, the preceding program may be stored in a computer readable storage medium, and when the program runs, steps of the above method embodiment are executed; the storage medium includes different media which are capable of storing program code such as: a ROM, a RAM, a magnetic disk, or an optical disk.

Figure 4:
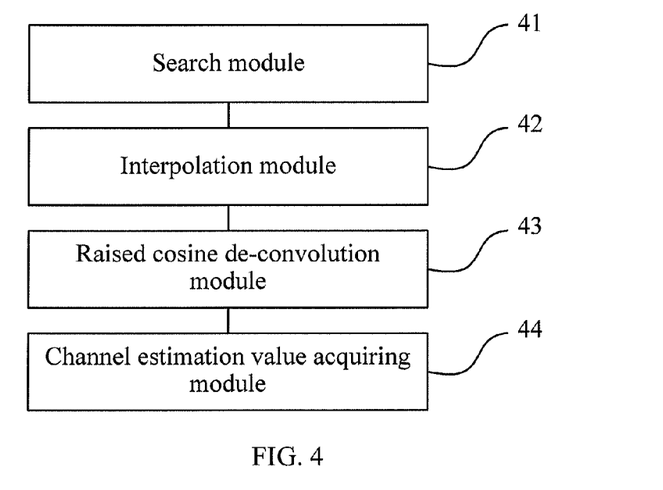
FIG. 4 is a schematic structural diagram of a channel estimating device according to an embodiment of the present invention.

FIG. 4 is a schematic structural diagram of a channel estimating device of the present invention. The channel estimating device of this embodiment may serve as a receiver or a part of a receiver to implement the process according to the embodiment shown in FIG. 1. As shown in FIG. 4, the channel estimating device may include: a search module 41, an interpolation module 42, a raised cosine de-convolution module 43, and a channel estimation value acquiring module 44.

The search module 41 is configured to perform multi-path searching on a pilot channel.

The interpolation module 42 is configured to perform interpolation on the channel estimation value at a radial position of the multi-path searching; in this embodiment, the performing interpolation on the channel estimation value at the radial position of the multi-path searching may be any interpolating method, such as Quadratic interpolation or Sinc interpolation. In the embodiments of the present invention, performing the Sinc interpolation of truncating a limited length on the channel estimation value at the radial position of the multi-path searching is taken as an example.

The raised cosine de-convolution module 43 is configured to perform raised cosine de-convolution on the channel estimation value that undergoes the interpolation performed by the interpolation module 42.

The channel estimation value acquiring module 44 is configured to acquire the channel estimation value at each radial position in the pilot channel according to the channel estimation value that undergoes the raised cosine de-convolution performed by the raised cosine de-convolution module 43 and a sample deviation acquired by performing the multi-path searching.

In the above embodiment, the interpolation module 42 performs interpolation on the channel estimation value at the radial position of the multi-path searching, the raised cosine de-convolution module 43 performs the raised cosine de-convolution on the channel estimation value that undergoes the interpolation; the channel estimation value acquiring module 44 acquires the channel estimation value at each radial position in the pilot channel according to the channel estimation value that undergoes the raised cosine de-convolution and a sample deviation acquired by performing the multi-path searching. The channel estimating device provided in this embodiment eliminates the sample deviation of the channel estimation value, improves the demodulation performance, and evidently reduces the operation workload.

Figure 5:
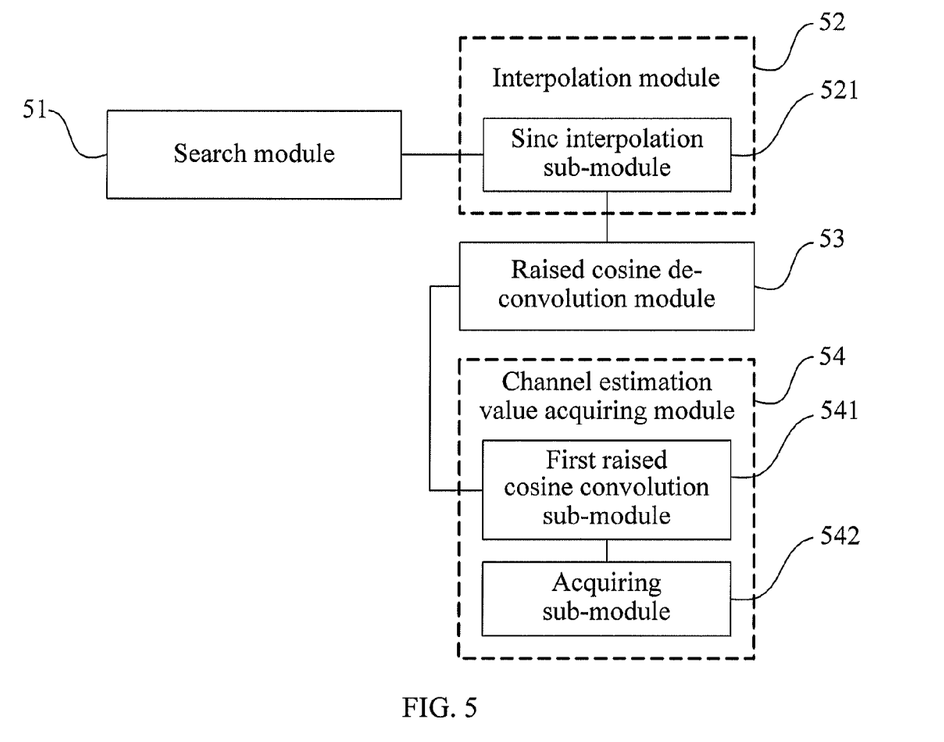
FIG. 5 is a schematic structural diagram of a channel estimating device according to another embodiment of the present invention.

FIG. 5 is a schematic structural diagram of a channel estimating device according to another embodiment of the present invention. The channel estimating device of this embodiment may serve as a receiver or a part of a receiver to implement the process according to the embodiment shown in FIG. 2. As shown in FIG. 5, the channel estimating device may include a search module 51, an interpolation module 52, a raised cosine de-convolution module 53, and a channel estimation value acquiring module 54.

The search module 51 is configured to perform multi-path searching on a pilot channel.

The interpolation module 52 is configured to perform interpolation on a channel estimation value at a radial position of the multi-path searching; in this embodiment, the performing interpolation on the channel estimation value at the radial position of the multi-path searching may be any interpolating method, such as Quadratic interpolation or Sinc interpolation. The interpolation module 52 may include: a Sinc interpolation sub-module 521, configured to perform Sinc interpolation of truncating a limited length on the channel estimation value at the radial position of the multi-path searching; specifically, the Sinc interpolation sub-module 521 may be a first Sinc interpolation sub-module, configured to perform convolution on the channel estimation value at the radial position of the multi-path searching and the channel estimation value of an adjacent path of the radial position with the Sinc coefficient that undergoes windowing and truncation, where the Sinc coefficient that undergoes windowing and truncation may be acquired by multiplying a Sinc function and a window function.

The raised cosine de-convolution module 53 is configured to perform raised cosine de-convolution on the channel estimation value that undergoes the interpolation performed by the Sinc interpolation sub-module 521; specifically, the raised cosine de-convolution module 53 may perform the raised cosine de-convolution according to equation (1).

The channel estimation value acquiring module 54 is configured to acquire the channel estimation value at each radial position in the pilot channel according to the channel estimation value that undergoes the raised cosine de-convolution and a sample deviation acquired by performing the multi-path searching.

The channel estimation value acquiring module 54 may include a first raised cosine convolution sub-module 541 and an acquiring sub-module 542. Specifically, the first raised cosine convolution sub-module 541 is configured to perform raised cosine convolution on the channel estimation value that undergoes the raised cosine de-convolution, where the sampling rate of the raised cosine convolution is the same as the sampling rate of the raised cosine de-convolution specifically, the first raised cosine convolution sub-module 541 may perform the raised cosine convolution according to equation (2). The acquiring sub-module 542 is configured to perform convolution on the channel estimation value that undergoes the raised cosine convolution and a Sinc coefficient that undergoes windowing and truncation to acquire the channel estimation value at each radial position in the pilot channel. The acquiring sub-module 542 performs the convolution on the channel estimation value that undergoes the raised cosine convolution and a Sinc coefficient that undergoes windowing and truncation, so as to add the sample deviation acquired by performing the multi-path searching to improve the accuracy of the acquired channel estimation value at each radial position in the pilot channel.

Figure 6:
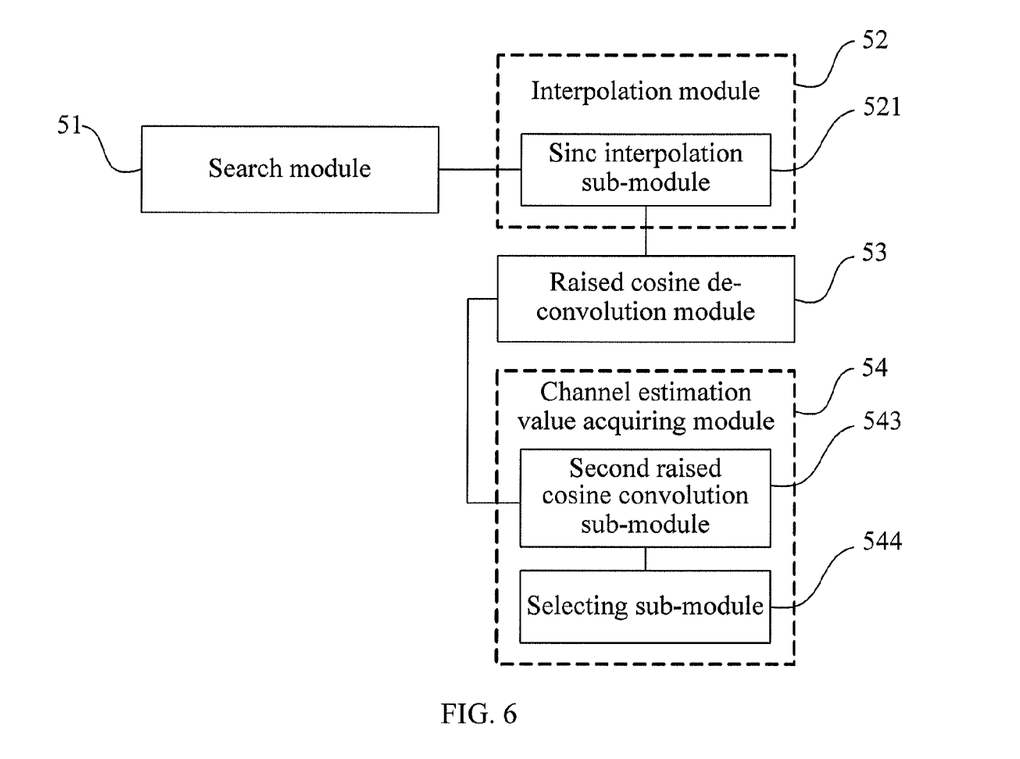
FIG. 6 is a schematic structural diagram of a channel estimating device according to still another embodiment of the present invention.

FIG. 6 is a schematic structural diagram of a channel estimating device according to still another embodiment of the present invention. The channel estimating device in this embodiment may serve as a receiver or a part of a receiver to implement the process according to the embodiment shown in FIG. 2. The difference between the channel estimating device in this embodiment and the channel estimating device in FIG. 5 lies in that in this embodiment, the channel estimation value acquiring module 54 may include a second raised cosine convolution sub-module 543 and a selecting sub-module 544.

Specifically, the second raised cosine convolution sub-module 543 is configured to perform raised cosine convolution on the channel estimation value that undergoes the raised cosine de-convolution, where the sampling rate of the raised cosine convolution is higher than the sampling rate of the raised cosine de-convolution; the selecting sub-module 544 is configured to select the channel estimation value at each radial position in the pilot channel among the channel estimation values that undergo the raised cosine convolution according to the sample deviation acquired by performing the multi-path searching.

The functions of other modules are the same as the functions of the modules in the channel estimating device according to the embodiment shown in FIG. 5, and are not described again here.

In the above embodiment, the interpolation module 52 performs interpolation on the channel estimation value at the radial position of the multi-path searching, the raised cosine de-convolution module 53 performs the raised cosine de-convolution on the channel estimation value that undergoes the interpolation; the channel estimation value acquiring module 54 acquires the channel estimation value at each radial position in the pilot channel according to the channel estimation value that undergoes the raised cosine de-convolution and a sample deviation acquired by performing the multi-path searching. The channel estimating device provided in this embodiment eliminates the sample deviation of the channel estimation value, improves the demodulation performance, and evidently reduces the operation workload.

Persons skilled in the art may understand that the accompanying drawings are only schematic diagrams of an exemplary embodiment, and the modules or processes in the drawings are not compulsory to implement the present invention.

Persons skilled in the art may understand that the modules in the device according to the embodiments may be distributed in the device of the embodiments as described in the embodiments, or disposed in one or multiple devices which are different from this embodiment after corresponding changes. The modules in the above embodiment may be combined into one module or further separated into multiple sub-modules.

Finally, it should be noted that, the above embodiments are merely provided for describing the technical solutions of the present invention, but not intended to limit the present invention. It should be understood by persons skilled in the art that modifications can be made to the technical solutions described in the embodiments, or equivalent replacements can be made to some technical features in the technical solutions, and such modifications or replacements do not make the essence of the technical solutions depart from the spirit and protection scope of the technical solutions of the embodiments of the present invention.

What is claimed is:

1. A channel estimating method, comprising:
    performing multi-path searching on a pilot channel, and performing interpolation on channel estimation values at radial positions of the multi-path searching;
    performing raised cosine de-convolution on channel estimation values that undergo the interpolation; and
    acquiring a channel estimation value at each radial position in the pilot channel according to channel estimation values that undergo the raised cosine de-convolution and sample deviation acquired by performing the multi-path searching.

2. The method according to claim 1, wherein the performing interpolation on the channel estimation values at the radial positions during the multi-path searching comprises:
    performing Sinc interpolation of truncating a limited length on the channel estimation values at the radial position of the multi-path searching.

3. The method according to claim 2, wherein the performing the Sinc interpolation of truncating a limited length on the channel estimation values at the radial positions of the multi-path searching comprises:
    performing convolution on each of the channel estimation values at the radial positions of the multi-path searching and a channel estimation value of an adjacent path of the radial position with a Sinc coefficient that undergoes windowing and truncation.

4. The method according to claim 1, wherein the acquiring the channel estimation value at each radial position in the pilot channel according to the channel estimation values that undergo the raised cosine de-convolution and the sample deviation acquired by performing the multi-path searching comprises:
    performing raised cosine convolution on the channel estimation values that undergo the raised cosine de-convolution, wherein a sampling rate of the raised cosine convolution is the same as a sampling rate of the raised cosine de-convolution; and
    performing convolution on the channel estimation values that undergo the raised cosine convolution and a Sinc coefficient that undergoes windowing and truncation to acquire the channel estimation value at each radial position in the pilot channel.

5. The method according to claim 1, wherein the acquiring the channel estimation value at each radial position in the pilot channel according to the channel estimation values that undergo the raised cosine de-convolution and the sample deviation acquired by performing the multi-path searching comprises:
    performing raised cosine convolution on the channel estimation values that undergo the raised cosine de-convolution, wherein a sampling rate of the raised cosine convolution is higher than a sampling rate of the raised cosine de-convolution; and
    selecting the channel estimation value at each radial position in the pilot channel according to the sample deviation acquired by performing the multi-path searching among the channel estimation values that undergo the raised cosine convolution.

6. A channel estimating device, comprising:
    a search module, configured to perform multi-path searching on a pilot channel;
    an interpolation module, configured to perform interpolation on channel estimation values at radial positions of the multi-path searching;
    a raised cosine de-convolution module, configured to perform raised cosine de-convolution on channel estimation values that undergo the interpolation performed by the interpolation module; and
    a channel estimation value acquiring module, configured to acquire a channel estimation value at each radial position in the pilot channel according to channel estimation values that undergo the raised cosine de-convolution and a sample deviation acquired by performing the multi-path searching.

7. The method according to claim 6, wherein the interpolation module comprises:
    a Sinc interpolation sub-module, configured to perform Sinc interpolation of truncating a limited length on the channel estimation values at the radial positions of the multi-path searching.

8. The device according to claim 7, wherein the Sinc interpolation sub-module comprises a first Sinc interpolation sub-module, configured to perform convolution on each of the channel estimation values at the radial positions of the multi-path searching and a channel estimation value at an adjacent radial of the radial position with a Sinc coefficient that undergoes windowing and truncation.

9. The device according to claim 6, wherein the channel estimation value acquiring module comprises:
    a first raised cosine convolution sub-module, configured to perform raised cosine convolution on the channel estimation values that undergo the raised cosine de-convolution, wherein a sampling rate of the raised cosine convolution is the same as a sampling rate of the raised cosine de-convolution; and
    an acquiring sub-module, configured to perform convolution on the channel estimation values that undergo the raised cosine convolution and a Sinc coefficient that undergoes windowing and truncation to acquire the channel estimation value at each radial position in the pilot channel.

10. The device according to claim 6, wherein the channel estimation value acquiring module comprises:
    a second raised cosine convolution sub-module, configured to perform the raised cosine convolution on the channel estimation values that undergo the raised cosine de-convolution, wherein a sampling rate of the raised cosine convolution is higher than a sampling rate of the raised cosine de-convolution; and a selecting module, configured to select the channel estimation value at each radial position in the pilot channel according to the sample deviation acquired by performing the multi-path searching among the channel estimation values that undergo the raised cosine convolution.

* * * * *